United States Patent
Acker (10) Patent No.: US 6,489,052 B1
(45) Date of Patent: Dec. 3, 2002

(54) FUEL CELL AIR PURIFICATION SUBSYSTEM

(75) Inventor: William P. Acker, Rexford, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/443,229

(22) Filed: Nov. 18, 1999

(51) Int. Cl.⁷ .................. H01M 4/92; H01M 4/86
(52) U.S. Cl. ............................ 429/40; 429/17
(58) Field of Search ................ 429/34, 13, 17, 429/26, 44, 40

(56) References Cited

U.S. PATENT DOCUMENTS

| | | |
|---|---|---|
| 4,212,854 A | 7/1980 | Maki et al. |
| 4,524,051 A | 6/1985 | Wright |
| 5,212,140 A | 5/1993 | Yoshimoto et al. |
| 5,221,649 A | 6/1993 | Yoshimoto et al. |
| 5,330,857 A * | 7/1994 | Sederquist et al. ........... 429/13 |
| 5,436,086 A * | 7/1995 | Seymour et al. ............. 429/17 |
| 5,595,949 A * | 1/1997 | Goldstein et al. ............ 502/20 |
| 5,620,672 A | 4/1997 | Galligan et al. |
| 5,658,681 A | 8/1997 | Sato et al. |
| 5,702,838 A | 12/1997 | Yasumoto et al. |
| 5,888,924 A | 3/1999 | Campbell et al. |
| 5,891,402 A | 4/1999 | Sassa et al. |
| 5,900,222 A | 5/1999 | Ito et al. |
| 6,124,054 A * | 9/2000 | Gorman et al. ............... 429/34 |
| 6,276,473 B1 * | 8/2001 | Zur Megede ............ 180/65.2 |

OTHER PUBLICATIONS

Internet Printout. http://www.justcatalyticconverters.co.uk/technic.htm, Oct. 2001.*

* cited by examiner

Primary Examiner—Carol Chaney
Assistant Examiner—Tracy Dove
(74) Attorney, Agent, or Firm—Trop, Pruner & Hu, P.C.

(57) ABSTRACT

A fuel cell system is specially adapted to provide enhanced air purification for stationary and mobile applications. An air purification subsystem may be installed along a cathode flow path to enhance air purification by utilization of fuel cell operating conditions. Synergistic automotive, residential, commercial and agricultural applications are thus provided. Air purification subsystems may include, for example, a multi-purpose platinum-based catalyst configuration adapted to convert carbon monoxide into carbon dioxide and ozone into diatomic oxygen.

22 Claims, 4 Drawing Sheets

FUEL CELL AIR PURIFICATION SUBSYSTEM

BACKGROUND

This invention relates to integrated power generation and air purification and conditioning systems for stationary and mobile applications. Specifically, an air purification subsystem may be installed in a fuel cell system across a cathode gas diffusion layer or along a cathode flow path to enhance air purification by utilization of fuel cell operating conditions.

A fuel cell is a device which converts chemical energy of a fuel into electrical energy, typically by oxidizing the fuel. In general a fuel cell includes an anode and a cathode separated by an electrolyte. When fuel is supplied to the anode and oxidant is supplied to the cathode, the cell electrochemically generates a useable electric current which is passed through an external load. The fuel typically supplied is hydrogen and the oxidant typically supplied is oxygen. In such cells, oxygen and hydrogen are combined to form water and to release electrons. The chemical reaction for a fuel cell using hydrogen as the fuel and oxygen as the oxidant is shown in equation (1).

$$H_2 + \tfrac{1}{2}O_2 \rightarrow H_2O \qquad (1)$$

This process occurs through two half-reactions which occur at the electrodes: Anode Reaction $$H_2 \rightarrow 2H^+ + 2e^- \qquad (2)$$

Cathode Reaction $$\tfrac{1}{2}O_2 + 2H^+ + 2e^- \rightarrow H_2O \qquad (3)$$

In the anode half-reaction, hydrogen is consumed at the fuel cell anode releasing protons and electrons as shown in equation (2). The protons are injected into the fuel cell electrolyte and migrate to the cathode. The electrons travel from the fuel cell anode to cathode through an external electrical load. In the cathode half-reaction, oxygen, electrons from the load, and protons from the electrolyte combine to form water as shown in equation (3).

The directional flow of protons, such as from anode to cathode, serves as a basis for labeling an "anode" side and a "cathode" side of the fuel cell.

Fuel cells are classified into several types according to the electrolyte used to accommodate ion transfer during operation. Examples of electrolytes include aqueous potassium hydroxide, concentrated phosphoric acid, fused alkali carbonate, stabilized zirconium oxide, and solid polymers, e.g., a solid polymer ion exchange membrane.

An example of a solid polymer ion exchange membrane is a Proton Exchange Membrane (hereinafter "PEM") which is used in fuel cells to convert the chemical energy of hydrogen and oxygen directly into electrical energy. A PEM is a solid polymer electrolyte which when used in a PEM-type fuel cell permits the passage of protons (i.e., $H^+$ ions) from the anode side of a fuel cell to the cathode side of the fuel cell while preventing passage of reactant fluids such as hydrogen and oxygen gases.

A PEM-type cell includes an electrode assembly disposed between an anode fluid flow plate and a cathode fluid flow plate. An electrode assembly usually includes five components: two gas diffusion layers; two catalysts; and an electrolyte. The electrolyte is located in the middle of the five-component electrode assembly. On one side of the electrolyte (the anode side) a gas diffusion layer (the anode gas diffusion layer) is disposed adjacent the anode layer, and a catalyst (the anode catalyst) is disposed between the anode gas diffusion layer and the electrolyte. On the other side of the electrolyte (the cathode side), a gas diffusion layer (the cathode gas diffusion layer) is disposed adjacent the cathode layer, and a catalyst (the cathode catalyst) is disposed between the cathode gas diffusion layer and the electrolyte.

Several PEM-type fuel cells may be arranged as a multi-cell assembly or "stack." In a multi-cell stack, multiple single PEM-type cells are connected together in series. The number and arrangement of single cells within a multi-cell assembly are adjusted to increase the overall power output of the fuel cell. Typically, the cells are connected in series with one side of a fluid flow plate acting as the anode for one cell and the other side of the fluid flow plate acting as the cathode for an adjacent cell.

The anode and cathode fluid flow plates are typically made of an electrically conductive material, typically metal or compressed carbon, in various sizes and shapes. Fluid flow plates may act as current collectors, provide electrode support, provide paths for access of the fuels and oxidants to the electrolyte, and provide a path for removal of waste products formed during operation of the cell.

The cell also includes a catalyst, such as platinum on each side of the electrolyte for promoting the chemical reaction(s) that take place in the electrolyte in the fuel cells. The fluid flow plates typically include a fluid flow field of open-faced channels for distributing fluids over the surface of the electrolyte within the cell.

Fluid flow plates may be manufactured using any one of a variety of different processes. For example, one technique for plate construction, referred to as "monolithic" style, includes compressing carbon powder into a coherent mass which is subjected to high temperature processes to bind the carbon particles together, and to convert a portion of the mass into graphite for improved electrical conductivity. The mass is then cut into slices, which are formed into the fluid flow plates. Typically, each fluid flow plate is subjected to a sealing process (e.g., resin impregnation) in order to decrease gas permeation therethrough and reduce the risk of uncontrolled reactions.

Fluid flow plates may also have holes therethrough which when aligned in a stack form fluid manifolds through which fluids are supplied to and evacuated from the stack. Some of the fluid manifolds distribute fuel (such as hydrogen) and oxidant (such as air or oxygen) to, and remove unused fuel and oxidant as well as product water from, the fluid flow fields of the fluid flow plates. Additionally, other fluid manifolds circulate coolant to control the temperature of the stack. For example, a PEM fuel cell stack may be maintained in a temperature range of from 60° C. to 200° C. The temperature of the anode and cathode exhaust streams may also be within this range as they leave the fuel cell. Cooling mechanisms such as cooling plates are commonly installed within the stack between adjacent single cells to remove heat generated during fuel cell operation.

PEM fuel cell systems using hydrogen as a fuel may include a fuel processing system such as a reformer to produce hydrogen by reacting a hydrocarbon such as natural gas or methanol. Many such fuel processing systems are well known in the art. Where a reformer is used, the reformed fuel gas is referred to as reformate, and may typically contain predominantly hydrogen, carbon dioxide and water. In some cases, reformate may also a relatively small amount of carbon monoxide. Since carbon monoxide, even in trace amounts, acts as a poison to most fuel cell catalysts, for example platinum-based catalysts, methods have been developed to minimize or eliminate carbon monoxide in reformate streams. Such methods include, for example, using a preferential oxidizer system to convert carbon monoxide into non-poisoning carbon dioxide, or optimizing fuel processor operating conditions such as temperature and air flow to minimize the production of carbon monoxide in the reformer.

Typically only a portion of the reactants (e.g., reformate containing hydrogen on the anode side, and air containing oxygen on the cathode side) flowing through a fuel cell will react. For example, the amount of reactants in the anode and cathode streams that are reacted may depend on factors including temperature, pressure, residence time, and catalyst surface area. For this reason, it may be desirable to feed excess reactants to a fuel cell in order to increase the reaction level to a point corresponding to a desired power output of the fuel cell. For example, it may be that 100 standard liters per minute (slm) of hydrogen must be reacted in a fuel cell to achieve a desired power output, but it is determined that 140 slm of hydrogen must be fed to the fuel cell to achieve this reaction of 100 slm of hydrogen. This system may be said to be running at 40% excess hydrogen at the anode inlet. In other terminology, this system may also be characterized as running at a stoichiometry of 1.4. For similar reasons, it may be desirable to supply the cathode side of the fuel cell with an excess of oxidant. The stoichiometry of the anode and cathode flows may be selected independently.

It will thus be appreciated that by reacting hydrogen from the anode stream, the fuel cell provides an anode exhaust stream that is concentrated in its non-hydrogen components. Likewise, by reacting oxygen from the cathode stream, the fuel cell provides a cathode exhaust stream that is concentrated in its non-oxygen components.

In most environments, fuel cell cathode air streams will not contain significant carbon monoxide levels because carbon monoxide is not generally present in fresh atmospheric air. However, in polluted environments, such as might be seen by fuel cells, for example, in or near automotive and commercial environments, the ambient air fed to the fuel cell may contain carbon monoxide as well as other air contaminants such as ozone. Carbon monoxide is a well known poison to humans and animals. Ozone is known to cause a variety of health problems including lung damage. Tropospheric ozone is also known to cause substantial damage to agricultural crops. Various other organic and non-organic pollutants may also be present in such environments, such as those emitted from automotive exhaust and the evaporation of organic solvents.

SUMMARY

In general, in one aspect, the invention provides a fuel cell system with an air purification subsystem located along the cathode flow path, wherein the air purification subsystem utilizes heat from the fuel cell to react air pollutants. In this context, the cathode flow path refers to the oxidant flow through the fuel cell system, starting with the oxidant inlet (e.g., an air blower or compressor), and ending with the cathode exhaust as it leaves the fuel cell system. In one possible embodiment, the air purification subsystem may include a multi-purpose catalys bed suitable for converting carbon monoxide into carbon dioxide, and converting ozone into diatomic oxygen. The air purification subsystem may also be effective to oxidize organic pollutants. In other embodiments, the catalyst bed may be selected to abate a specific air pollutant. As examples, suitable catalysts may include precious metals and alloys thereof, being supported by conventional means known in the art such as alumina and zeolite monoliths, and carbon black catalyst support systems. In one possible embodiment, the electrodes of the fuel cell may include a multi-purpose platinum-based catalyst structure and composition that is optimized to provide enhanced air purification in addition to the hydrogen oxidation required to power the fuel cell. In general, the air purification subsystem may be located up or downstream of the fuel cell, or along the cathode flow plates of the fuel cell, or on the fuel cell cathode or cathode side gas diffusion layer.

In another aspect, the invention contemplates systems for providing purified air to an interior air space of a building or a vehicle, as examples, by treating the cathode air flow of a fuel cell system with the catalytic air purification subsystem, and then supplying the interior air space with the cathode exhaust from the fuel cell. The decrease in oxygen in the cathode stream may be referred to as the cathode oxygen depletion. Additional embodiments may include a means for selecting the cathode flow rate of the fuel cell system to control the cathode oxygen depletion of the cathode exhaust. For example, the stoichiometry of the cathode flow may be set to provide a cathode oxygen depletion of less than 10% or less than 5%, as examples. A by-pass may also be provided to control the flow of the cathode exhaust into the interior air space. A heat exchanger may also be provided to control the temperature of the cathode exhaust. A dehumidifier may also be provided to control the humidity of the cathode exhaust.

In another aspect, the air purification subsystem can include a catalyst bed adapted to react carbon monoxide at an operating temperature of the fuel cell system. For example, carbon monoxide may be reacted at a temperature of less than 200° C. for certain fuel cell systems, or less than 100° C. or less than 80° C. for other fuel cell systems. In another aspect, the air purification subsystem can include a catalyst bed adapted to react ozone at such operating temperatures. As an example, for a system adapted to focus on carbon monoxide removal, it may be desirable for the purification subsystem to be located in the cathode flow path at a point upstream from the fuel cell. As another example, for a system adapted to focus on ozone removal, it may be desirable for the purification subsystem to be located in the cathode flow path at a point downstream from the fuel cell.

Other advantages and features of the invention will be apparent from the description, drawings and claims.

DETAILED DESCRIPTION

Figure 1:
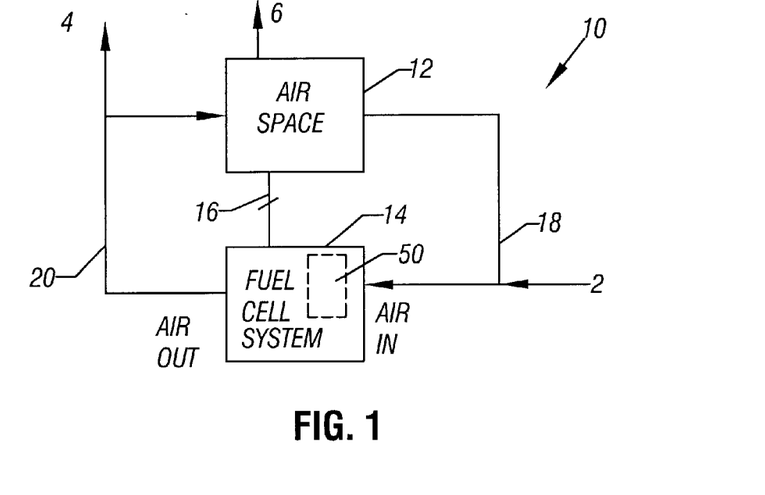
FIG. 1 is a block diagram of an air circulation system according to an embodiment of the invention.

Referring to FIG. 1, an embodiment of an air circulation system 10 includes a fuel cell system 14 that supplies electrical power (via electrical lines 16) to a building having an air space 12 and purifies the air in the air space 12. The air space may be the interior air space of a building, such as a home or office building, or as another example, the interior air space of a vehicle. The air space may also have a vent 6, for example to vent to the atmosphere. It will also be appreciated that where the fuel cell system 14 is vented to the atmosphere, for example, through line 4, the present invention may also be used to purify the ambient air around the fuel cell system 14, as fed to the fuel cell for example through line 2.

The fuel cell system 14 may include a fuel cell stack 50 that consumes both oxygen and hydrogen to produce the electrical power. The oxygen may be taken, for example from the air around the fuel cell system 14, or from the interior air space 12. The hydrogen may be provided, for example, from a natural gas reformer (not shown) in the fuel cell system 14. As other examples, the hydrogen may be provided from hydrogen tanks or other hydrogen storage systems such as hydrogen storage alloys.

In the embodiment shown in FIG. 1, air is drawn into the fuel cell stack 50 through cathode inlet conduit 18. Within the stack 50, the air passes over the fuel cell cathode (not shown), and passes out of the stack 50 as cathode exhaust through cathode outlet conduit 20. In this particular embodiment, the air purification subsystem consists of the modifications made to the cathode to optimize its air purification capabilities over what would normally be required just for fuel cell operation (see discussion below). Inside the fuel stack 50, the stream of air passes across the modified cathode of each fuel cell of the stack 50, and as a result, the air flowing through the fuel cells is purified, for example as pollutants are oxidized. Therefore, the air that returns to the air space 12 from the fuel cell system 14 may be cleaner than the air that exits the air space 12. Thus, due to this arrangement, the fuel cell system 14 may provide dual functions: a power function in which the fuel cell system 14 supplies electrical power and an air purification function in which the fuel cell system 14 purifies the air in the air space 12.

Figure 2:
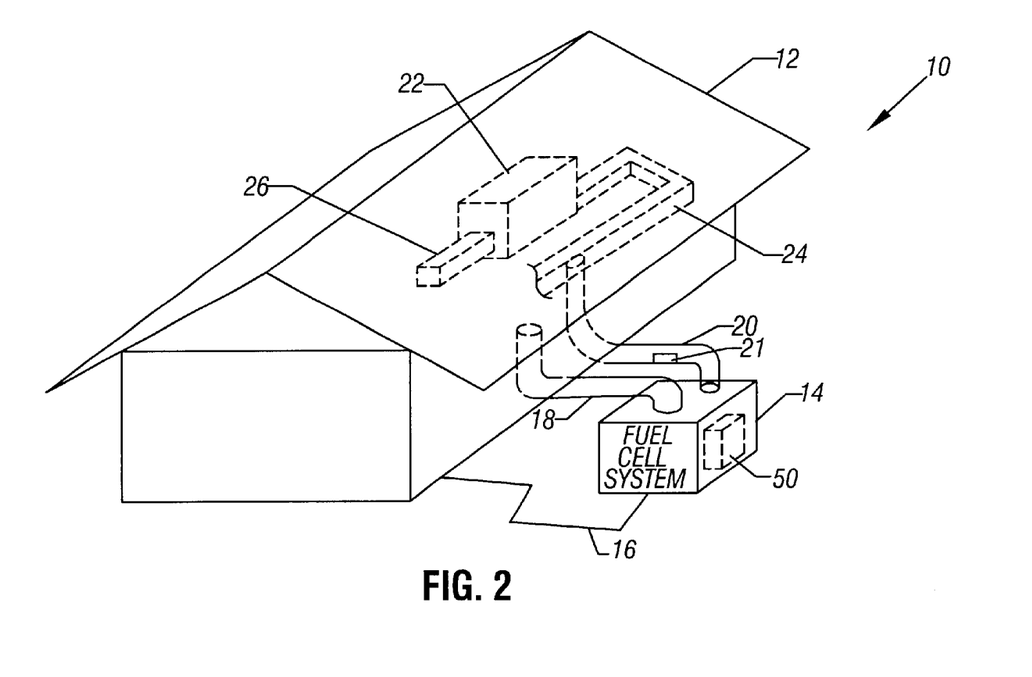
FIG. 2 is a building with a fuel cell system and air purification subsystem according to an embodiment of the invention.

Referring to FIG. 2, as a more specific example, the fuel cell system 14 may reside outside of the air space 12 and may be connected into an air circulation path with an interior region of the air space 12 via an cathode inlet conduit 18 and a cathode outlet conduit 20. In this manner, the cathode inlet conduit 18 may receive air from the interior region of the air space 12 and direct a stream of air into the fuel cell system 14. The fuel cell system 14, in turn, uses oxygen from the stream of air to promote the cathodic reactions of its fuel cells. At the same time, the catalysts of the fuel cells produce a purified stream of air that is routed through the cathode outlet conduit 20 to a region inside the air space 12. For example, in some embodiments, the cathode outlet conduit 20 may be connected to an air intake return duct 24 for a climate control unit 22 of a climate control system of the air space 12.

The climate control system may maintain the interior of the air space 12 at a specified climate, such as a specified temperature and/or humidity. As examples, the climate control unit 22 may be an interior unit of an air conditioning system, a heating system, a humidifying system or a dehumidifying system, as just a few examples. Thus, in some embodiments, the purified air may be injected into the return duct 24 to be heated, cooled, humidified or dehumidified by the climate control unit 22 before exiting an output duct 26 of the climate control unit 22 to propagate throughout the air space 12 through additional ducts (not shown). The climate control unit 22 may be located within air space 12, or may also be located within fuel cell system 14. In this context, the terms ducts and conduits are used interchangeably to refer to the way the cathode flow path of the fuel cell system 14 is connected, for example to air space 12. The invention is not limited according to the means by which the cathode flow path is connected.

It will be appreciated that the cathode exhaust of the fuel cell system 14 will be at about the same temperature as the fuel cell stack 50, for example, an operating temperature in the range of 60° C. to 200° C. Thus, where it is desired to heat the air space 12, as might be the case with a building or vehicle of such a system in a cold climate, the heat from the fuel cell stack 50 may be used to efficiently provide air that is not only purified, but also pre-heated. It will also be appreciated that where it is desired to cool the air space 12, as might be the case with a building or vehicle of such a system in a hot climate, it may be undesirable to introduce the warm cathode exhaust into the air space 12. For example, in such a case the cathode inlet might instead be taken from the outside air around the fuel cell system 14 to preserve the cool air in the air space 12, and similarly the cathode exhaust might be vented to the atmosphere. In such a configuration, the purification fumction of the fuel cell system 14 would be directed to the atmosphere around the fuel cell system 14.

Figure 3:
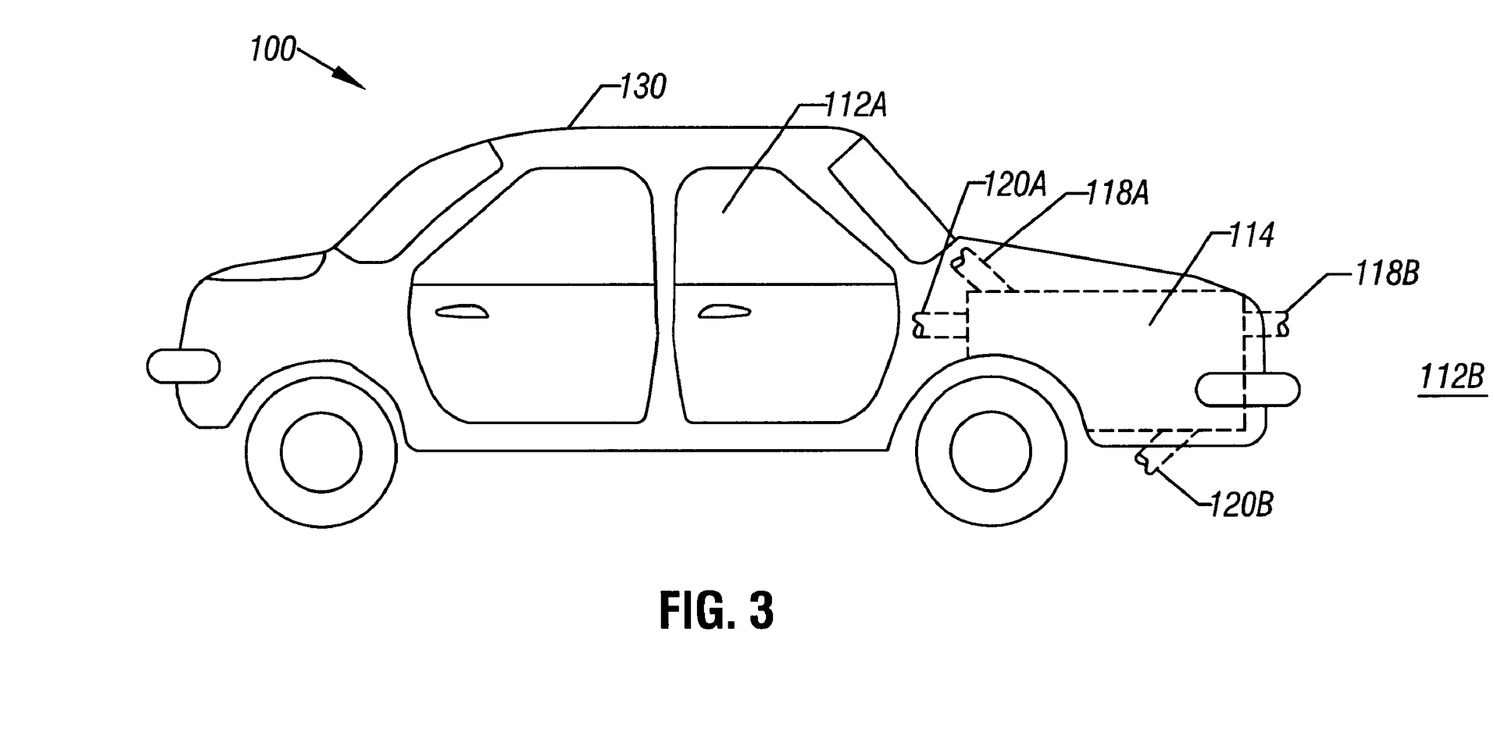
FIG. 3 is a vehicle with a fuel cell system and air purification subsystem according to an embodiment of the invention.

Referring to FIG. 3, an embodiment of an air circulation system 100 includes a fuel cell system 114 that supplies electrical power to a vehicle 130, for example to propel the vehicle 130, and also provides purified air to the air space 112A of the vehicle 130. The fuel cell system 114 may draw oxygen, for example from the air space within the vehicle 112A through cathode inlet conduit 118A, or from the air space outside the vehicle 112B through cathode inlet conduit 118B. As previously discussed with respect to FIGS. 1 and 2, the air passing through the fuel cell system 114 is purified, and may be flowed into the vehicle air space 112A through cathode outlet conduit 120A, or may be vented to the atmosphere around the vehicle 112B through cathode outlet conduit 120B. For example, the fuel cell system 114 of vehicle 130 may be used to clean pollutants from the air space outside the vehicle 130 as the vehicle is driven and air from air space 112B circulates through the fuel cell system 114. Such a vehicle 130 could provide the advantage of removing more pollutants from the air 112B than produced by the vehicle 130, and thus could be referred to as a sub-zero emission vehicle.

Figure 4:
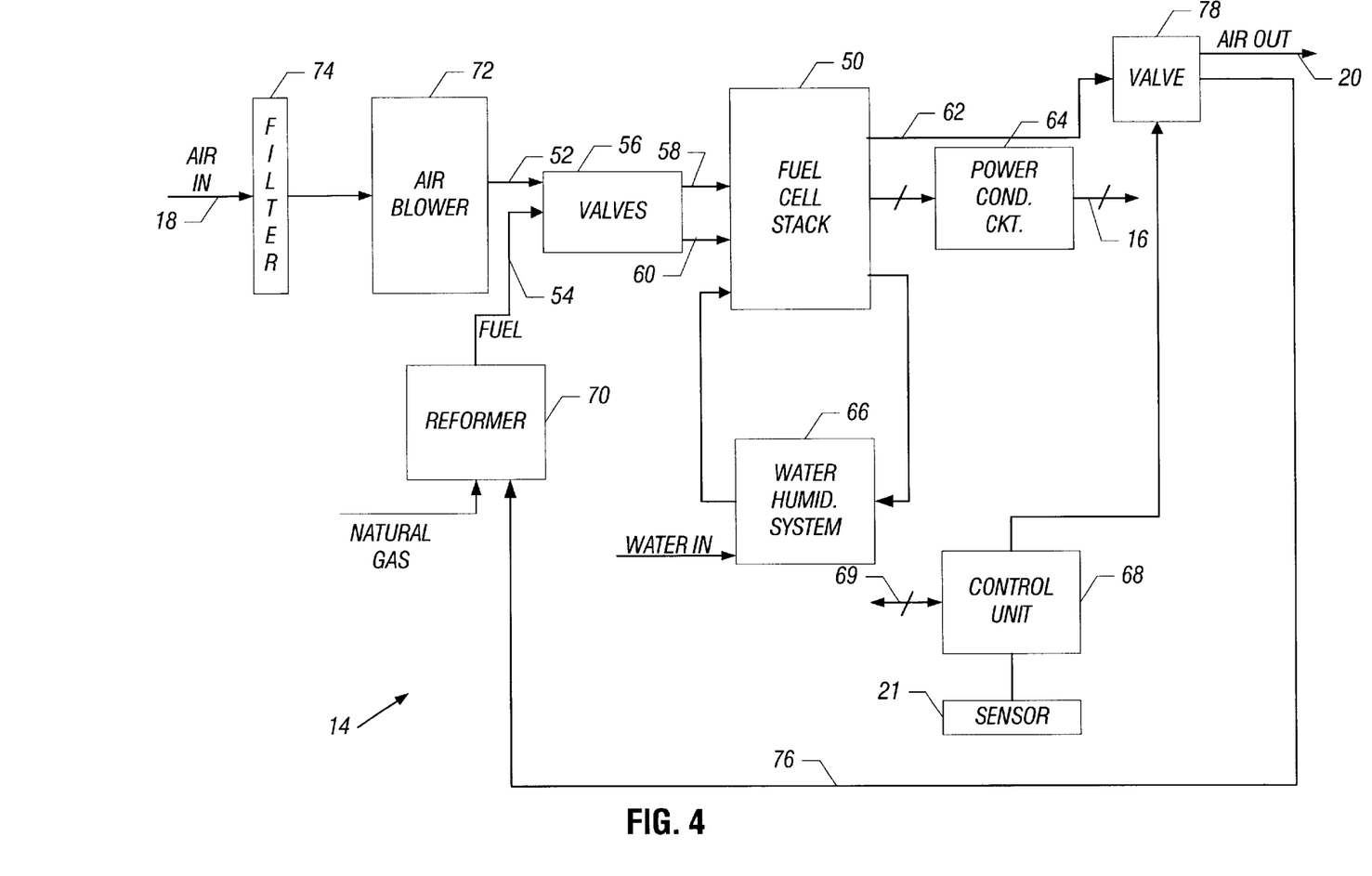
FIG. 4 is a schematic diagram of a fuel cell system that may be used in accordance with the present invention.

FIG. 4 depicts one of many possible embodiments of the fuel cell system 14. As shown in FIG. 4, the fuel cell system 14 may include a particulate filter 74 that is connected to the cathode inlet conduit 18 to filter particles from the incoming air before the air reaches an air blower 72. The air blower 72, in turn, may be controlled by an electrical control unit 68 (via one or more electrical control lines 69, for example) to regulate a rate at which the air flows from the blower 72 through an air conduit 52 into control valves 56. As an example, the rate of air flow out of the air blower 72 may be dependent on the output power (as indicated by an output current, for example) that is currently being provided by the fuel cell system 14. Through a fuel input conduit 54, the control valves 56 also receive hydrogen (the fuel). The control valves 56 maintain the appropriate flow rates of the hydrogen and air into respective conduits 58 and 60 that direct the hydrogen and air into the fuel cell stack 50.

In some embodiments, the fuel cell system 14 may include an air control valve 78 that is coupled between the cathode outlet conduit 20 and a conduit 62 that is connected to an air exhaust port of the fuel cell stack 50. In this manner, the electrical control unit 68 may regulate the valve 78 to control when the purified air exits the fuel cell system 14 and enters the air space 12. For example, the climate control unit 22 (see FIG. 2) during its normal course of operation may turn on and off (turn its air blower on and off, for example) as needed to regulate the climate of the air space 12. Thus, it may be desirable for the purified air to enter the air intake duct 24 when the climate control unit 22 is turned on (otherwise referred to as the climate control unit 22 being in an "on state"), and it may be desirable to prevent the purified air from entering the return duct 24 when the climate control unit 22 is off (otherwise referred to as the climate control unit 22 being in an "off state"). To accomplish this, in some embodiments, the control unit 68 may be electrically coupled to the climate control unit 22 to receive a signal from the climate control unit 22 to indicate whether the blower of the unit 22 is turned on (i.e., the climate control unit 22 is turned on) or off (i.e., the climate control unit is turned off.

In other embodiments, as another example, the control unit 68 may be coupled to a sensor 21 that is positioned inside the cathode outlet conduit 20. Due to this arrangement, the control unit 68 may use the sensor 21 to determine when the climate control unit 22 has its blower turned on. For example, the sensor 21 may be an acoustic sensor that the control unit 68 uses to recognize an acoustic signature (that propagates through the duct work) to indicate that the blower of the climate control unit 22 has been turned on. Alternatively, the sensor 21 may be, for example, a pressure sensor to detect a slight vacuum that indicates the climate control unit's blower has been turned on. Other arrangements are possible.

Among the other features of the fuel cell system 14, a power conditioning circuit 64 may receive a DC voltage from the fuel cell stack 50 and furnish to the electrical lines 16 one or more AC voltages. The fuel cell system 14 may also include a water humidification system 66 to vaporize deionized water and circulate the vapor through the fuel cell stack 50 to humidify the air and hydrogen. In this manner, the humidified air and hydrogen keep membranes of the fuel cell stack 50 from drying out. A reformer 70 may receive propane or natural gas (as examples) and convert the gas into the hydrogen fuel that is consumed by the fuel cell stack 50. In some embodiments, when the air control valve 78 blocks communication between the conduits 62 and 20, the valve 78 establishes communication between the conduit 62 and a conduit 76 that is connected to the reformer 70. In this manner, when the purified air is not being furnished to the air space 12, the purified air may be used to, as an example, oxidize carbon monoxide (CO) that is a byproduct of the reactions that occur in the reformer 70.

It will be appreciated that as the cathode air stream flows through the stack 50, due to the reaction of oxygen from the cathode stream to form product water, the cathode exhaust may be significantly concentrated in carbon dioxide and saturated with humidity. Such an exhaust stream may be used as generally shown in FIGS. 1 and 2 to provide an ideal air feed system for a greenhouse or other agricultural applications, since the utilization of both moisture and carbon dioxide is generally essential to plant life. For example, cathode air might be taken from outside a greenhouse (to provide normal amounts of oxygen to the fuel cell), and then the humid cathode exhaust could be supplied to a greenhouse. The carbon dioxide rich anode exhaust could also be supplied to the greenhouse.

Where a fuel cell system such as shown in FIGS. 1 and 2 is used to supply purified air to an internal air space 12, it will be appreciated that the inherent cathode oxygen depletion of such a system may serve to undesirably reduce the amount of oxygen in the air space 12. For example, in the Earth's atmosphere, while the relative concentration of oxygen in the atmosphere does not significantly change with altitude, at higher altitudes there is less pressure and therefore less oxygen available for breathing. Atmospheric pressure at sea level is about 14.7 psi, while the pressure at 18,000 feet is about 7.3 psi. Thus, for example, at 10,000 feet, an average person's blood might contain only 90% of its normal oxygen level. The reduced availability of oxygen at high altitudes may be taken as a rough analogy to the reduced availability of oxygen in an oxygen deplete fuel cell cathode exhaust stream.

To minimize the degree of oxygen depletion in a cathode exhaust stream to acceptable levels, for example 2% to 10%, it may therefore be desirable to operate the cathode stream at a higher flow rate with respect to the stoichiometric requirements of the fuel cell system 14. For example, in a system such as shown in FIGS. 1 and 2, the cathode outlet conduit 18 might be equipped with an oxygen sensor to control the cathode flow rate at a level corresponding to an acceptable level of oxygen depletion (less than 5% or 2% as examples). It will be appreciated that a higher cathode flow rate may tend to lower the operating temperature of the fuel cell stack 50. Thus, it is contemplated that a cooling subsystem (not shown) of the fuel cell system 14 may be responsive to the above cathode flow modulations to control or optimize the operating temperature of the stack 50.

Figure 5:
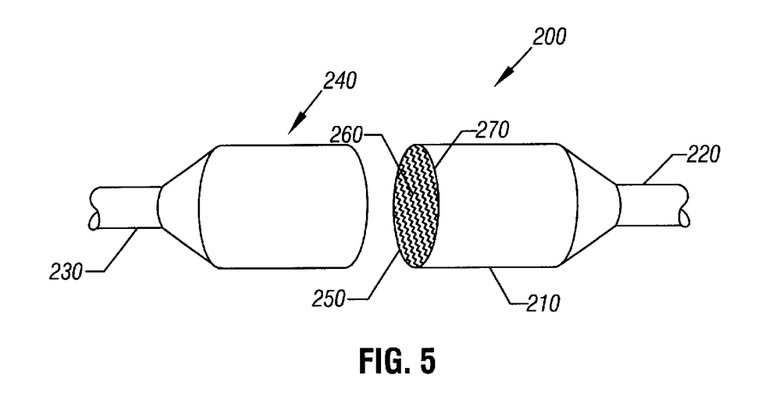
FIG. 5 is an exploded view of an air purification subsystem according to an embodiment of the invention.

Referring to FIG. 5, an air purification subsystem 200 is shown that could be used in an embodiment of the invention. Housing 210 has an inlet 220, an outlet 230, and a central portion 240 housing a catalytic monolith 250. The subsystem 200 could be located, for example, in the cathode flow path of a fuel cell system (not shown) immediately downstream from a fuel cell stack, so that inlet 220 receives cathode exhaust from the fuel cell stack. The exhaust is then passed through monolith 250, which due to heating from the cathode exhaust passing through it (as an example), is at a temperature corresponding to the operation temperature of the fuel cell stack (e.g., about 80–200° C., depending on the particular system). Monolith 250 can be a ceramic or zeolite substrate 260 coated with a catalyst 270 suitable for oxidizing carbon monoxide at the temperature of the fuel cell stack. In this respect, the housing 210 and its contents may be generally referred to as a catalyst bed, though the term catalyst bed may also refer to other configuration, such as non-monolith arrangements (e.g., catalyst coated ceramic spheres, etc.). The catalyst 270 can be, for example, a platinum based material such as the Premair® catalyst available from Engelhard Corporation. As another example, the catalyst 270 can be pure platinum, or platinum alloys asknown in the art for oxidizing carbon monoxide. Such materials may also be selected specifically to optimize the reaction of ozone from the cathode-stream.

As another example, the catalyst 270 can comprise a cement carrier including activated carbon and an alkali, the cement being impregnated with palladium or a palladium alloy. Such a catalyst arrangement is taught by Maki, et al., U.S. Pat. No. 4,212,854, which is hereby incorporated by reference. Another possible catalyst arrangement suitable for temperatures above about 80° C., is a hopcalite type catalyst consisting of manganese dioxide mixed with the oxide of a metal such as copper, iron, cobalt or silver. Another possible catalyst arrangement is a tin (IV) oxide support with a thin precious metal layer as taught by Wright, et al., U.S. Pat. No. 4,524,051, which is hereby incorporated by reference.

Another possible catalyst arrangement is an A type zeolite impregnated with the cathode stream. For example, a ceramic honeycomb monolith containing $MnO_2$, NiO, CuO, or $Ag_2O$ may be used as noted in Yoshimoto, et al., U.S. Pat. Nos. 5,212,140 and 5,221,649, which are hereby incorporated by reference. Discussion of the utilization of various ozone catalyst systems, both new and well known arrangements is provided in Galligan, et al., U.S. Pat. No. 5,620,672, Campbell, et al., U.S. Pat. No. 5,888,924, and Sassa, et al., U.S. Pat. No. 5,891,402, which are also hereby incorporated by reference.

Figure 6:
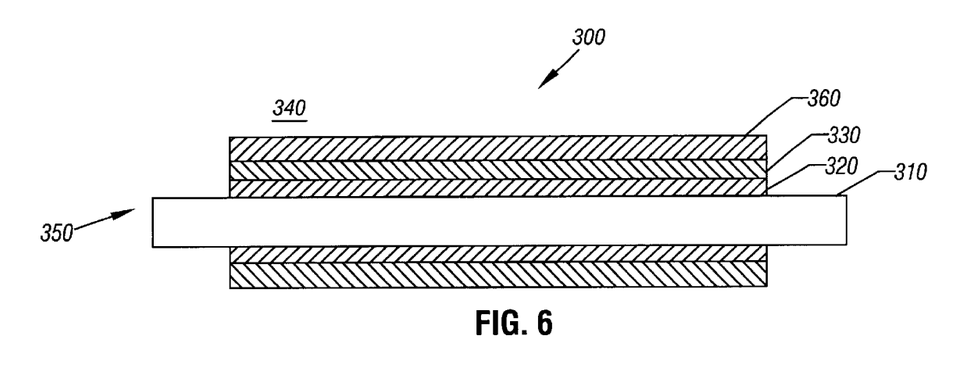
FIG. 6 is an air purification subsystem according to an embodiment of the invention.

Referring to FIG. 6, another air purification subsystem 300 is shown that could be used in an embodiment of the invention. As previously discussed, PEM fuel cells typically utilize a five layer configuration consisting of a polymeric membrane 310 having a catalyst layer 320 on either side, the catalyst layer being further enclosed by gas diffusion layers 330 on either side. Membrane 310 is a solid polymer (e.g., a solid polymer ion exchange membrane), such as a solid polymer proton exchange membrane (e.g., a solid polymer containing sulfonic acid groups). Such membranes are commercially available from E.I. DuPont de Nemours Company (Wilmington, Del.) under the trademark NAFION. Alternatively, membrane 310 can also be prepared from the commercial product GORE-SELECT, available from W.L. Gore & Associates (Elkton, Md.). As another example, the membrane may be made from a polybenimidazole material, such as taught by Onorato, et al., U.S. Pat. No. 5,945,233, which is hereby incorporated by reference. Catalyst layers 320 can include, as examples, platinum, platinum alloys, platinum dispersed on carbon black, and other materials known in the art. Also as known in the art, gas diffusion layers 330 can be formed of porous conductive materials such as carbon paper or carbon cloth.

The cathode side 340 of the membrane electrode assembly 350 shown in FIG. 6 has an additional air purification catalyst layer 360. Air purification catalyst layer 360 may consist of the catalyst materials described with respect to FIG. 5. While in the embodiment shown in FIG. 6, the catalyst layer 360 is shown as an external layer to gas diffusion layer 330, it will be appreciated that catalyst layer 360 may also be applied as an additional layer to fuel cell catalyst layer 320. Alternatively, layer 360 may be combined into layer 320 to achieve multiple functions from the same catalyst.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system comprising:
   a cathode flow path; and
   a fuel cell comprising a first catalyst layer in the cathode flow path to promote an electrochemical reaction in the fuel cell and a second catalyst layer in the cathode flow path to react an air pollutant, the second layer being separate from the first layer.

2. The system of claim 1, wherein the second layer comprises a catalyst bed to react carbon monoxide ataan operating temperature of the fuel cell.

3. The system of claim 1, wherein the second layer comprises a catalyst bed to react carbon monoxide at a temperature of less than 200° C.

4. The system of claim 1, wherein the second layer comprises a catalyst bed to react carbon monoxide at a temperature of less than 100° C.

5. The system of claim 1, wherein the second layer comprises a catalyst bed to react carbon monoxide at a temperature of less than 80° C.

6. The system of claim 1, wherein the second layer comprises a catalyst bed to react ozone into diatomic oxygen.

7. The system of claim 2, wherein the fuel cell further comprises a catalyst gas diffusion layer located adjacent to the second catalyst layer.

8. The system of claim 2, the fuel cell being part of a fuel cell stack consuming oxigen from the cathode flow path, wherein the fuel cell stack depletes less than 5 percent of an available oxygen in the path from the path.

9. The system of claim 6, the fuel cell being part of a fuel cell stack consuming oxigen from the cathode flow path, wherein the fuel cell stack depletes less than 5 percent of an available oxygen in the path from the path.

10. The system of claim 2, the fuel cell being part of a fuel cell stack consuming oxigen from the cathode flow path, wherein the fuel cell stack depletes less than 2 percent of an available oxygen in the path from the path.

11. The system of claim 6, the fuel cell being part of a fuel cell stack consuming oxigen from the cathode flow path, wherein the fuel cell stack depletes less than 2 percent of an available oxygen in the path.

12. The system of claim 8, further comprising a vehicle having an interior air space, a cathode exhaust port of the fuel cell, and a duct connected between the cathode exhaust port and the vehicle, the duct providing flow communication between the cathode exhaust port and the interior air space of the vehicle.

13. The system of claim 9, further comprising a vehicle having an interior air space, a cathode exhaust port of the fuel cell, and a duct connected between the cathode exhaust port and the vehicle, the duct providing flow communication between the cathode exhaust port and the interior air space of the vehicle.

14. The system of claim 12, further comprising a heat exchanger connected to the duct and adapted to control a temperature of the cathode exhaust, and a dehumidifier connected to the duct and adapted to control the humidity of the cathode exhaust.

15. The system of claim 13, further comprising a heat exchanger connected duct and adapted to control a temperature of the cathode exhaust, and a dehumidifer connected to the duct and adapted to control the humidity of the cathode exhaust.

16. The system of claim 2, further comprising a building having an interior air space, a cathode exhaust port of the fuel cell, and a duct connected between the cathode exhaust port and the building, the duct providing flow communication between the cathode exhaust port and the interior air space of the building.

17. The system of claim 6, further comprising a building having an interior air space, a cathode exhaust port of the fuel cell, and a duct connected between the cathode exhaust port and the building, the duct providing flow communication between the cathode exhaust port and the interior air space of the building.

18. A fuel cell system for providing enhanced air purification comprising:
   a fuel cell having an anode inlet stream, an anode exhaust stream, a cathode air inlet stream, and a cathode exhaust stream;

a cathode flow path comprised of the cathode inlet stream, a cathode side of the fuel cell, and a cathode exhaust stream;

an air purification catalyst bed located along the cathode flow path, the catalyst bed containing a multi-purpose catalyst selected to react air pollutants;

a duct providing flow communication from the cathode exhaust stream to an interior air space;

a by-pass for controlling a flow of the cathode exhaust stream into the interior air space;

a heat exchanger connected to the duct and adapted to control a temperature of the cathode exhaust; and a dehumidifer connected to the duct and adapted to control a humidity of the cathode exhaust.

19. A fuel cell system comprising:

a cathode flow path;

a fuel cell;

an air purification subsystem located along the cathode flow path comprising a catalyst bed in the cathode flow path and being separate from the fuel cell, the catalyst bed further comprising a platinum-based catalyst material; and wherein the air purification subsystem utilizes an operating temperature of the fuel cell system to react an air pollutant.

20. The system of claim 19, wherein the catalyst bed is located downstream from the fuel cell.

21. A system compnsing:

a fuel cell including a cathode flow path;

an air purification subsystem located along the cathode flow path, the air purification system utilizing an operating temperature of the fuel cell to react an air pollutant;

a vehicle having an interior passenger air space; and a duct to provide air flow communication between the air purification system and the interior passenger air space of the vehicle.

22. A system comprising:

a fuel cell including a cathode flow path;

an air purification subsystem located along the cathode flow path, the air purification subsystem utilizing an operating temperature of the fuel cell to react an air pollutant;

a building having an interior air space; and a duct to provide air flow communication between the air purification system and the interior air space of the building.

* * * * *

UNITED STATES PATENT AND TRADEMARK OFFICE
CERTIFICATE OF CORRECTION

PATENT NO. : 6,489,052 B1 Page 1 of 1
DATED : December 3, 2002
INVENTOR(S) : William P. Acker It is certified that error appears in the above-identified patent and that said Letters Patent is hereby corrected as shown below:

Column 9,
Line 62, "ataan" should be -- at an --.

Column 10,
Line 47, after "connected" insert -- to the --.

Signed and Sealed this

Fourth Day of March, 2003

JAMES E. ROGAN
*Director of the United States Patent and Trademark Office*